United States Patent [19]

Keefe

[11] 4,223,637
[45] Sep. 23, 1980

[54] BIRD FEEDER

[76] Inventor: Harry Keefe, 42 Clapboard Ridge, Danbury, Conn. 06810

[21] Appl. No.: 956,252

[22] Filed: Oct. 30, 1978

[51] Int. Cl.³ ............................................. A01K 39/00
[52] U.S. Cl. ................................. 119/52 R; 119/51 R; 119/53
[58] Field of Search ..................... 119/52 R, 53, 51 R, 119/63

[56] References Cited

U.S. PATENT DOCUMENTS

| | | | |
|---|---|---|---|
| 1,993,445 | 3/1935 | Hemstreet | 119/52 R |
| 2,768,469 | 10/1956 | Mathias | 119/52 R |
| 2,775,226 | 12/1956 | Early | 119/51 R |
| 3,354,868 | 11/1967 | Woodling | 119/52 R |
| 3,913,527 | 10/1975 | Kilham | 119/51 R |

Primary Examiner—Jay N. Eskovitz
Attorney, Agent, or Firm—John J. Swartz

[57] ABSTRACT

A pre-fillable, throw-away bird feeder, including a tubular container having at least one bird feed emitting opening in the side wall thereof, a perch mounted on the container for movement between a generally horizontal bird roosting position, and a generally vertical position, and a closure for the opening mounted on the perch for closing the opening when the perch is in the vertical position.

26 Claims, 15 Drawing Figures

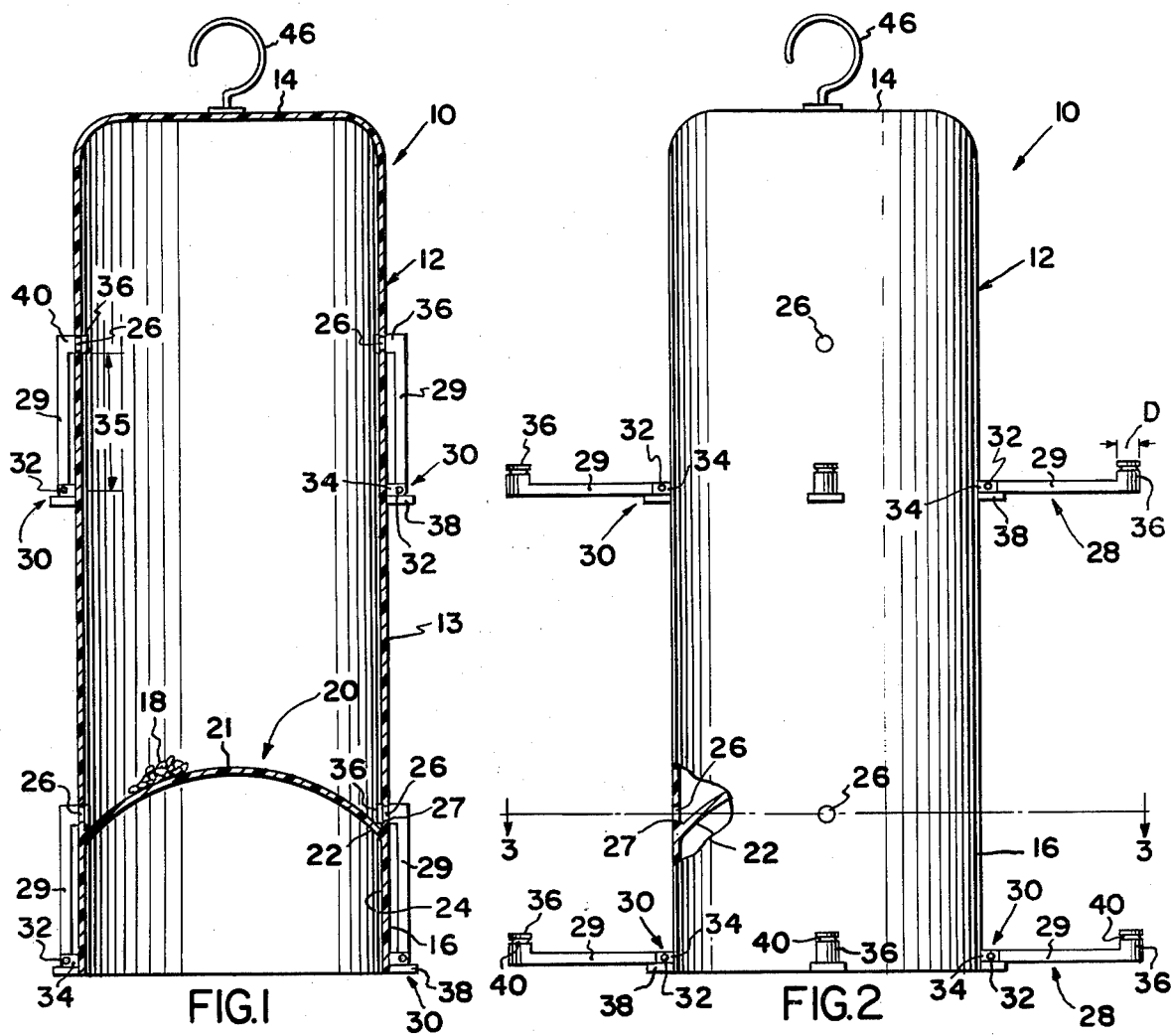
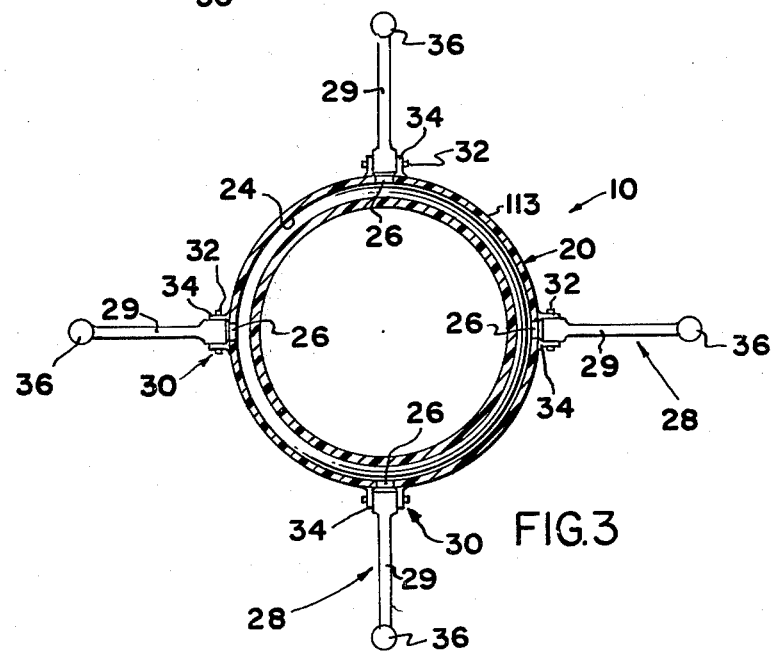

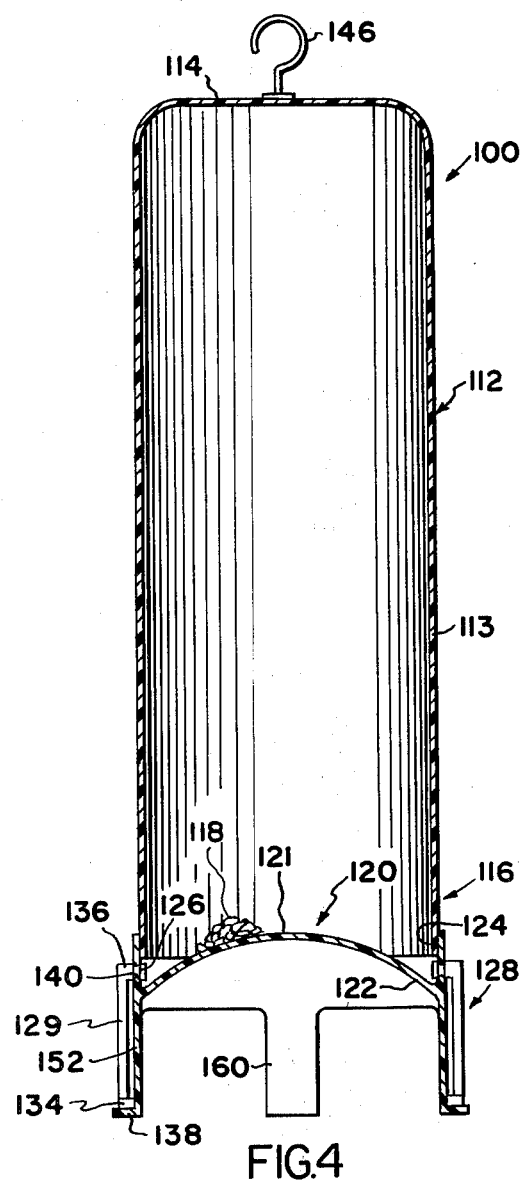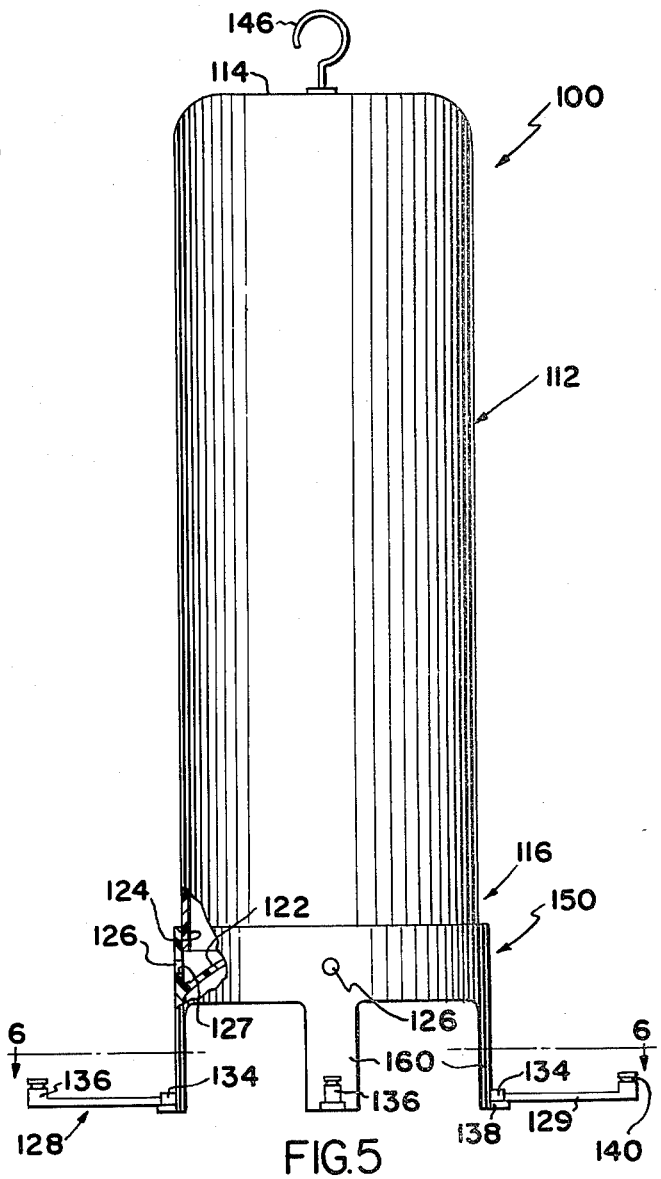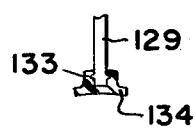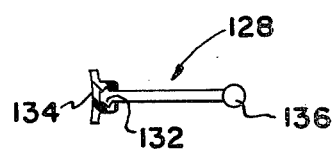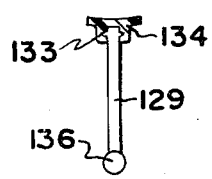

BIRD FEEDER

BACKGROUND OF THE INVENTION

This invention relates to a bird feeder, and more particularly to a throw-away bird feeder, including a stowable bird roosting perch and a closure for closing a bird feed aperture when the perch is in the stowed position. The bird feeder includes at least one bird seed emitting opening in the sidewall thereof, and a perch-plug which, in one position, serves as a roost for birds, and in another position, functions to close the bird seed opening.

Bird feeders of the permanent type have been provided heretofore and generally include a bird seed receiving hopper. The so-called permanent bird feeders are relatively expensive, but yet fragile and sometimes have to be replaced after limited use. Bird feed for such permanent feeders is commonly sold in polyethylene bags in the 2-20 pound weight class. The unit bases of seed purchased in such quantities is relatively expensive. Seeds may also be more economically purchased in bulk bags weighing approximately 100 pounds, however, such bags are relatively difficult to handle and store. Such stored seeds also attract rodents. If the seed happens to fall on the floor, a dangerous condition can be created because the seeds, if stepped on, will sometimes slide to the floor.

The filling of such permanent bird feeders is frequently unpleasant. An individual can handcarry a scoop of seed from the seed storage area to the feeding station and fill the feeder, but this is rather time consuming. The problem is exacerbated in adverse weather conditions including low temperatures and rain and snow because the feed in the bucket will sometimes become wet and promptly freeze in one solid mass. On the other hand, the user can remove the feeder from the feeding station to a warm building where the feeder can be filled and thereafter returned to the outside, but once again, this requires additional time.

Accordingly, it is an object of the present invention to provide a new and novel pre-fillable, throw-away bird feeder.

It is another object of the present invention to provide a bird feeder including a container having transparent material which will permit the user to easily gauge the quantity of feed remaining in the container.

Yet another object of the present invention is to provide a bird feeder including a sealed container which will secure the bird feed prior to use and includes bird seed emitting openings which are initially closed by closure members that may be removed from the openings to permit birds to perch thereon and remove the seed from the container.

Still another object of the present invention is to provide a bird feeder of the type described including openings in the sidewall and a bird perch which is mounted for movement between a position in which birds can roost thereon and an upstanding position adjacent the container and a closure for the opening mounted on a perch to close the opening when the perch is in the upstanding position.

A further object of the present invention is to provide a bird feeder of the type described including a bird perch which is swingably mounted on the feeder for movement between a horizontal position in which birds may roost thereon and a vertical position, and a plug head mounted on the perch for plugging the opening when the perch is in the vertical position.

A still further object of the present invention is to provide a bird feeder of the type described including a bottom wall constructed so as to urge the bird seed to the sidewall of the feeder as the seed moves downwardly.

Another object of the present invention is to provide a bird feeder including a tubular upper section for storing bird seed and a base having laterally outwardly opening apertures in the sidewall thereof communicating with the bird seed to permit birds to remove seed through the apertures.

Still another object of the present invention is to provide a bird feeder of the type disclosed including an upper transparent storage bag mounted on a base forming a closure for the bag, an opening being provided in the base for emitting bird seed stored in the bag.

Other objects and advantages of the present invention will become apparent to those of ordinary skill in the art as the description thereof proceeds.

SUMMARY OF THE INVENTION

A bird feeder comprising a hollow container having an upstanding sidewall with at least one laterally outwardly opening feed opening therein for emitting bird feed; a perch for birds mounted on the container at a level below the feed opening, for movement between a laterally outwardly projecting position in which birds can roost thereon and an upstanding position alongside a portion of the sidewall; the perch including a plug receivable by the opening to close the opening when the perch is in the upstanding position.

The present invention may more readily be understood by reference to the accompanying drawings in which:

FIG. 1 is a sectional side view of a bird feeder constructed according to the present invention, illustrating the perch-plugs in vertical positions closing the seed emitting openings;

FIG. 2 is a side elevational view of the bird feeder illustrated in FIG. 1, but with the perch-plugs in horizontal, roost positions, part of the sidewall being broken away in section to more clearly illustrate the bottom wall thereof;

FIG. 3 is a top plan sectional view, taken along the line 3—3 of FIG. 2, illustrating the perch-plugs in the adjusted bird roosting positions;

FIG. 4 is a sectional side view of a slightly modified bird feeder illustrating the perch-plugs in positions closing the bird seed emitting openings;

FIG. 5 is a side elevational view of the bird feeder illustrated in FIG. 4, but illustrating the perch-plugs in horizontal, roost positions, part of the sidewall being broken away in section to more particularly illustrate a portion of the base;

FIG. 6 is a top plan sectional view, taken along the line 6—6 of FIG. 5, illustrating the perch-plugs in the adjusted bird roosting positions;

DESCRIPTION OF THE INVENTION

Figure 7:
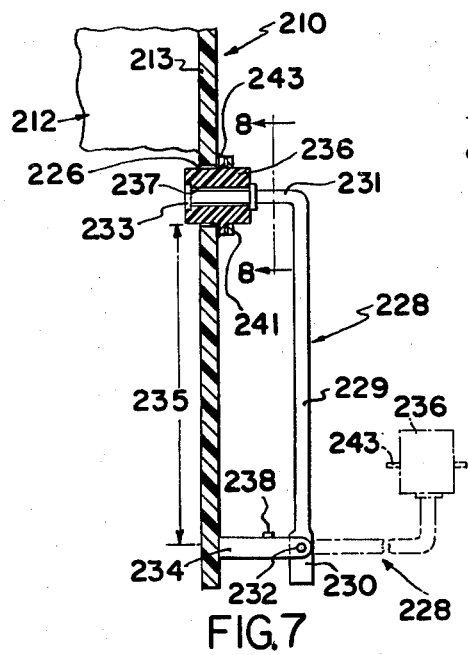
FIG. 7 is an enlarged sectional side elevational view illustrating another modified construction.

A bird feeder constructed according to the present invention is generally designated 10, and includes a hollow cylindrical housing or container 12 of rigid, transparent plastic material. The housing 12 includes a tubular sidewall 13 closed at its upper end by a topwall 14 and having an open ended lower end 16. The tubular or cylindrical housing 12 may be inverted at the time of manufacture and filled with seeds 18. The lower end 16 is then closed via a closure wall 20 which, when installed, is convex as illustrated in the drawing. The closure wall 20 may suitably comprise a layer or sheet of preformed rigid plastic which is heat sealed at its perimeter 22 to the inner surface 24 of the housing sidewall 13. The lower wall 20 may also comprise an initially planar layer of flexible cardboard which has a diameter initially greater than the internal diameter of the housing 12, but when installed is forced to the position illustrated in FIGS. 1 and 2, in which the central sheet portion 21 will be at a level higher than the level of the perimetrical edge 22 which will bear against the sidewall in springing engagement therewith to be held therein by friction.

The convex sidewall 20 supports the seeds 18 and in addition, functions to direct the seeds 18 last remaining in the container 12 to the laterally outer edge 22 as the seeds 18 fall by gravity.

A plurality of vertically and circumferentially spaced, radially outwardly opening bird seed emitting openings or apertures 26 are provided in the sidewall 13. The lower edges 27 of the lowermost apertures 26 are flush with the upper surface of the bottomwall perimetrical edge 22. The diameter of the openings 26 relative to the size of the seeds 18 is such that the seeds 18 do not freely pour therethrough, but yet is sufficiently large to permit a bird to remove seed.

A bird perch, generally designated 28, is provided adjacent each opening 26 and includes a circular, elongate rod 29 having a mounting end 30 pivotly mounted on a pin 32, fixed to a mounting block 34 which is secured to the sidewall 13. The bird perch 28 is swingable between a bird roosting position illustrated in FIG. 2 in which the feeding birds may roost thereon, and a generally vertical, stowed position alongside the container sidewall 13 as illustrated in FIG. 1. The diameter of the rod 29 is equal to or slightly less than the diameter of opening 26 so that the birds can clamp their feet about the rod 29. The outer terminal end of rod 29 mounts an enlarged head or plug 36 which is received by the opening 26 when the perch 28 is in the stowed position illustrated in FIG. 1 to close the opening. One such perch is mounted adjacent each of the holes 26 so that each opening 26 can be plugged by a plug 36 when desired. The mount 34 includes a stop 38 mounted on the sidewall to limit downward swinging movement of the perch below the horizontal position illustrated in FIG. 2. The combination perch 28 and plug 36 is sometimes referred to hereinafter as a "perch-plug".

Each of the heads 36 comprises resilient material having an outer diameter D which is slightly greater than the diameter of the apertures 26. Intermediate the ends of each head 36 is an annular recess or ring depression 40, the root of which has a diameter substantially equal to the diameter of aperture 26 so as to bear against the sidewall edges 27 defining the apertures 26, and prevent access to seeds through the aperture 26 when the perch-plug is in the position illustrated in FIG. 1. The mounts 34 are placed a predetermined distance 35 below the openings 26 so that birds roosting on the rods 29, in the positions illustrated in FIG. 3, will have easy access to the apertures 26. The resilient plug 36 is sufficiently compressible that the enlarged head 36 will pass into and out of the opening 26.

The apertures 26 may be sequentially opened, starting at the uppermost holes and thence working downwardly after the birds have removed the seeds in the upper portion of the container above the previously opened apertures. If the bird feeder is to be stored, the perches 28 are swung to the positions illustrated in FIG. 1 so that the plugs 36 are once again received by the apertures 26.

A hanger 46 is mounted on the topwall 14 so that the feeder may be hung from a tree limb or the like. When the feeder is ready for use, the person merely snaps down the uppermost perch rods 29 to the positions illustrated in FIG. 3 and hangs the device in a tree. Birds will roost on the rods 29 and will use their beaks to peck seeds adjacent the apertures 26. As the birds feed and the seed level lowers to the level of the uppermost apertures 26, the lowermost perches 28 are then swung down to open the lowermost apertures 26. The convex bottomwall 20 will direct the last remaining seeds 18 radially outwardly toward the lowermost apertures so that all of the seed 18 will be utilized. When all of the seed 18 is eventually removed, the unit 10 is discarded and another pre-filled unit 10 is placed in its stead.

ALTERNATE EMBODIMENT

Referring now more particularly to the embodiment illustrated in FIGS. 4–6, a prefilled bird feeder, generally designated 100, is illustrated and includes a polyethylene bag 112 having a flexible, transparent sidewall 113 closed at its upper end by a topwall 114, and an open ended lower end 116. The sidewall 113 of bag 112 does not include apertures or openings therein. A hook 146 is mounted to the upperwall 114 for hanging the bag 112 from the limb of a tree or the like.

The lower end 116 of the bag sidewall 113 is heat sealed to the inner surface 124 of the upper end of a circular base, generally designated 150. The base 150 includes an annular or ring sidewall 152 spanned by a convex bottomwall 120 having a raised central portion 121 and a lower perimetrical terminal edge portion 122 integral with the sidewall 152. The ring 152 may suitably comprise rigid plastic material. The sidewall or ring 152 includes a plurality of circumferentially spaced, radially outwardly opening, bird seed emitting apertures 126 which have lower edges 127 substantially flush with the upper side of the perimetrical edge 122 of the bottomwall 120.

The bottomwall 120 is tapered downwardly, radially outwardly, as illustrated in FIG. 4, to urge or direct the last remaining seeds 118 laterally outwardly as they move downwardly under the force of gravity to direct the seeds toward the outer wall 152 and the apertures 126. The lower end 116 of the sidewall 112 is heat sealed or otherwise suitably secured to the plastic ring 152. The ring 152 includes a plurality of integral, generally vertical, legs 160, including integral brackets 134 pivotally mounting a plurality of perch members 128. The inner ends of perch members 128 include pivot pins 132 received by complementally formed recesses 133 in brackets 134. The pivot pins 132 are free to rotate in the recesses 134.

Each of the perches 128 include a rod-like member 129 forming a roost for feeding birds when the rod is in the laterally or radially outwardly projecting position illustrated in FIGS. 5 and 6. Mounted on the rod-like member 129 is an enlarged resilient head 136 substantially identical to the plug 36 illustrated in FIGS. 1–3. An annular recess 140 is provided on the head 136, the root of which has a diameter substantially equal to the diameter of the aperture 126, to seal the aperture 126 when the plug 136 is in the position illustrated in FIG. 4. The head 136 is sufficiently compressible when the enlarged head 136 is inserted into and out of the aperture 126 so that the head 136 will snap into and out of the recess 126. The flexible container 112 may be filled with seed 118 before being sealed to the base 150. On the other hand, the bag 112, with its top open, may be sealed to the base 150, and seeds 118 thereafter placed in the open top which is heat sealed. A stop 138 is integrally molded with the dependent legs 160 and the mounting brackets 134 to inhibit swinging movement of the perch 128 to a position below the horizontal position illustrated in FIG. 5.

In operation of the embodiment illustrated in FIGS. 4–6, the user merely hangs the feeder 110 from a tree via the hook 146. The user then opens one or more of the openings 126 by swinging one or more perches 128 from the upstanding position illustrated in FIG. 4 to the generally horizontal position illustrated in FIG. 5. Birds will then roost on the rod-like perch 129 and peck the seeds adjacent the opening 126. When the seeds adjacent the openings 126 are removed, the superjacent seeds will fall under the force of gravity. As the last remaining seeds 118 move downwardly under the force of gravity, the bottomwall 120, which tapers downwardly, radially outwardly, will urge the seeds 118 toward the holes 126. The sidewalls 112 which are transparent, will permit the user to easily see when the unit is empty. When the unit 110 is empty, it may be replaced by an identical pre-filled container 110.

ALTERNATE EMBODIMENT—II

Figure 8:
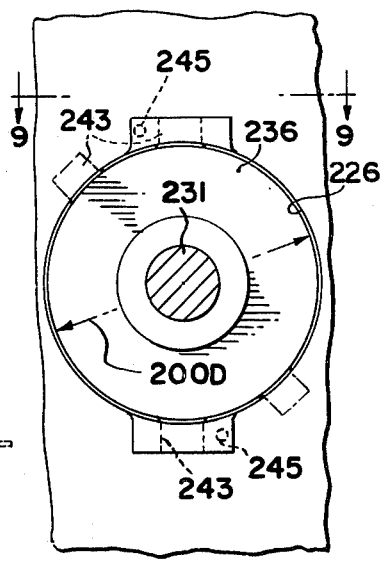
FIG. 8 is a sectional end view, taken along the line 8—8 of FIG. 7.
Figure 9:
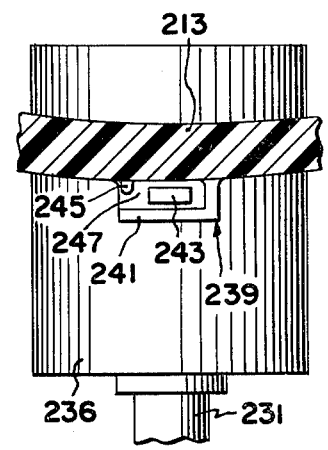
FIG. 9 is a sectional plan view, taken along the line 9—9 of FIG. 8.

Referring now to FIGS. 7–9, a slightly modified bird feeder, generally designated 210, includes a hollow, upstanding, cylindrical housing or container 212, of rigid transparent plastic material substantially identical to the housing 12 and similar parts will be identified by identical reference characters preceeded by the digit 2.

The housing 212 includes a plurality of circumferentially and vertically spaced openings 226. A bird perch, generally designated 228, is pivotally mounted on the tubular sidewall 213 adjacent each opening 226, and includes a circular, elongate rod 229 having mounting ends 230 pivotally mounted on a pin 232 provided on a bracket 234. The perch rod 229 includes an offset terminal end 231 provided with a terminal shoulder 233. A plug 236 is provided and includes a central aperture 237 therethrough receiving the rod end 231. The plug 236 is mounted on the rod end 231 for to-and-fro rotating movement about an axis of rod end 231 between the position illustrated in solid lines in FIG. 8 and an open position illustrated in chain lines in FIG. 8. As opposed to the plug 36, the plug 236 is not force fit into the opening 226, but is freely rotatable therein. A stop 238 is provided on the bracket 234 in the path of rod end 230 to limit downward swinging movement of rod 229.

Integral with the sidewall 213, adjacent the openings 226, is a pair of laterally outwardly projecting L-shaped catch members or projections 239 having circumferentially extending flanges or distal ends 241 which are yieldable laterally outwardly for a purpose to become apparent. Each plug 236 includes a pair of diametrically opposed, outwardly projecting tabs 243 which are received between the terminal ends 241 and the sidewall 213. A nib 245, integral with the sidewall, projects outwardly towards the terminal end 241 and interrupts the swinging movement of the tabs 243 when the tabs 243 are in the closed positions and received in the recess 247 defined by the terminal end 241 and the sidewall 213. The tabs 243 are yieldable so as to move laterally outwardly and snap over the nibs 245 when the plug 236 is to be rotated between the open and closed positions. As the tabs 243 move between the open and closed positions the terminal ends 241 are forced outwardly by the tabs 243 to permit the tabs 243 to pass between the nibs 245 and the terminal ends 241 of the catch members 239. The outer diameter 200D of the plug 236 is slightly less than the diameter of the apertures 226, to permit the plug to freely rotate on the perch 231 when the plug is received by the aperture 226. When the tabs are released, the perch 228 may be swung downwardly to a horizontal position in which the plug 236 is removed from the aperture 226.

ALTERNATE EMBODIMENT—III

Another modified bird feeder, illustrated in FIGS. 10–13, is generally designated 310 and is generally similar to the bird feeder 10 illustrated in FIG. 1. Generally similar parts will be identified with similar numerals preceeded by the digit 3.

Figure 11:
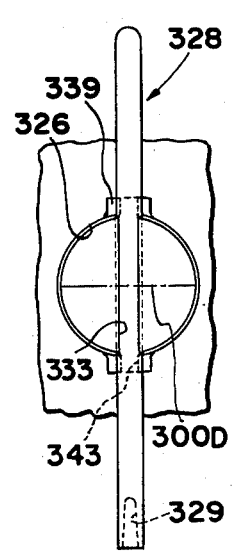
FIG. 11 is an end elevational view taken along the line 11—11 of FIG. 10.
Figure 12:
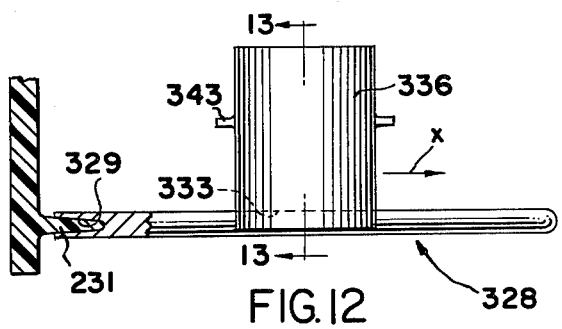
FIG. 12 is a sectional side elevational view, of the apparatus illustrated in FIG. 10, but with the perch-plug in a generally horizontal position.
Figure 13:
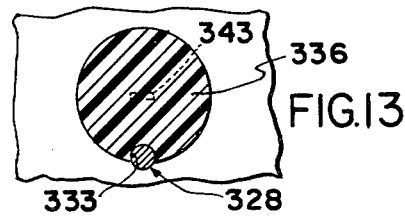
FIG. 13 is a sectional side view, taken along the line 13—13 of FIG. 12.

The perch 328 comprises a roost member having, in one end thereof, aperture 329 which frictionally receives a laterally outwardly projecting post 331 integral with the sidewall 313 when the perch 328 is in the laterally outwardly projecting position illustrated in FIG. 12. The perch rod 328 may be slid off the post 331 and moved to an upstanding or stowed position illustrated in FIGS. 10 and 11.

Figure 10:
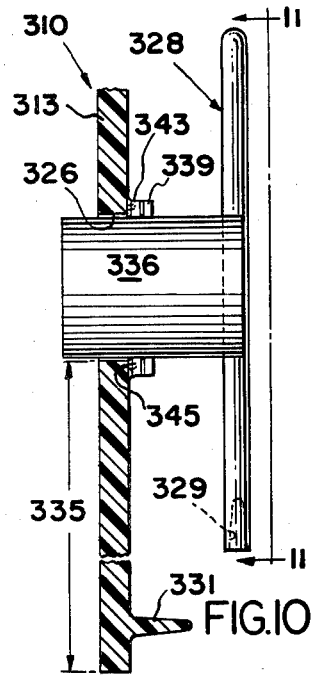
FIG. 10 is an enlarged sectional, side elevational view illustrating yet another modified construction with the perch-plug in a generally vertical position.

A plug 336 is slidably mounted on the perch rod 328 for movement between the position illustrated in FIGS. 10–12 and a position entirely removed from the rod. The perch plug 336 includes a semi-circular recess 333 which snugly fits the rod 328 but permits relative sliding movement thereof. The bird feeder sidewall 313 includes catch members or projections 339 and nibs 345 identical to the projection 239 and nibs 245 illustrated in FIGS. 8 and 9. The perch plug 336 includes tabs 343 identical to the tabs 243 which are illustrated in FIGS. 7–9. The perch rod 328 functions as a handle, with increased leverage, to turn the plug 336 in the opening 226. The diameter 300D of the perch plug is slightly less than the diameter of the recesses of the apertures 326.

In the position of the parts illustrated in FIG. 10, the perch rod 328 functions as a handle to greatly increase the mechanical advantage of the person turning the plug 336 in the aperture 326.

When the perch rod 328 and the plug 326 are rotated so that the tabs 343 are removed from the catch members 339, the perch plug 336 is removed from the aperture 326 and then slid off in the direction of the arrow x until the plug 336 is removed from the rod 328. The rod 328 is then mounted on the perch projection or post 331 in the position illustrated in FIG. 12.

ALTERNATE EMBODIMENT—IV

Figure 14:
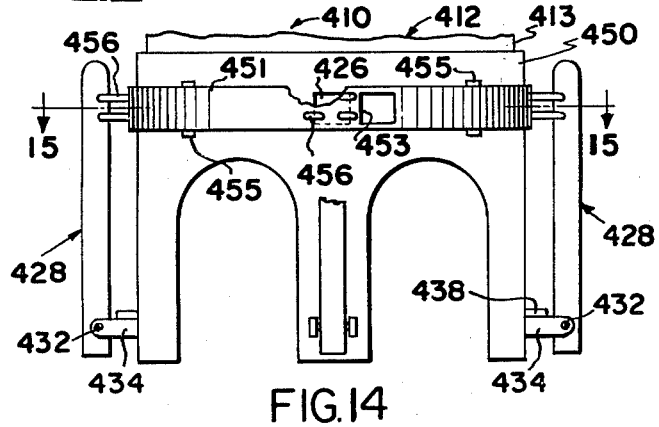
FIG. 14 is a side elevational view of still another modified bird feeder construction.
Figure 15:
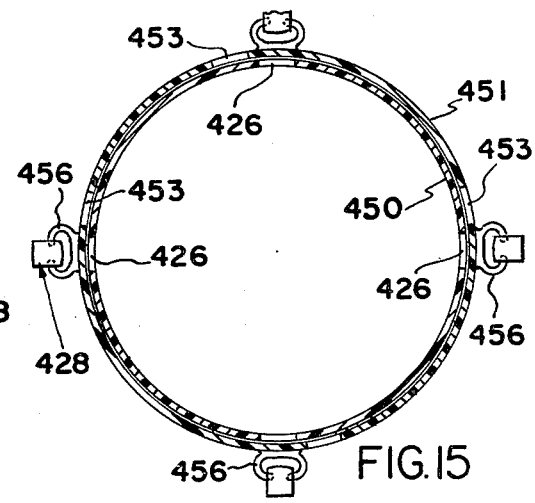
FIG. 15 is a top plan sectional view, taken along the line 15—15 of FIG. 14.

The bird feed container 410, illustrated in FIGS. 14 and 15, is constructed substantially similar to the container 110 illustrated in FIGS. 4–6 and similar parts will be identified by reference characters having the identical last two digits but preceeded by the digit 4. The perch members 428 are swingably mounted on mount members 434, however, there are no plugs, similar to plugs 36, mounted thereon.

At the level of the apertures 426 provided in the base 450, a band or ring 451 of plastic material is mounted on the outside of the base 450 for to-and-fro rotating movement between a position in which apertures 453 provided in the band 451 are in registry with the apertures 426 and a closed position in which the apertures 426 and 453 are out of registry. Nibs 455, integral with the base 450, vertically support the band 451. By adjusting the position of the band 451, the effective size of the apertures 426 may be accurately controlled to provide any selected one of a plurality of different size openings.

The band 451 mounts a plurality of circumferentially spaced pairs of outwardly projecting clips 456 which slightly expand to receive and releasably hold the perch rods 428 when the perch rods are in the stowed or upstanding position illustrated in FIG. 14. The coupling of the perch 428 to the clips 456 also functions to lock the ring 451 in the closed position so that the apertures 426 and 453 are maintained out of registry.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A bird feeder comprising:
   a hollow container having an upstanding sidewall;
   at least one laterally outwardly opening feed aperture in said sidewall for emitting bird feed; and
   a perch for birds movable between a laterally, outwardly projecting position, so that birds can roost thereon, and an upstanding position, alongside a portion of said sidewall;
   said perch including plug means, receivable by said opening, for closing said aperture when said perch is in said upstanding position;
   said perch being swingably mounted on said container, at a level below said feed aperture, for swinging movement between said laterally outwardly projecting position and said upstanding position.

2. The feeder set forth in claim 1 wherein said sidewall comprises transparent material.

3. The feeder set forth in claim 1 wherein the lower end of said container is closed by an arcuate wall, spanning said sidewall, said arcuate wall including a raised central portion and a lower, downwardly diverging perimetrical edge portion.

4. The feeder set forth in claim 1 wherein said container includes a lower end and a convex bottomwall closing the lower end of said container, said convex wall including a raised central portion and a perimetrically extending, lower terminal lip portion, said lip portion including an upper surface flush with the lowermost edge of at least one of said apertures.

5. The feeder set forth in claim wherein mounting means is provided on said sidewall at a level below said aperture for pivotally mounting said perch means.

6. The feeder set forth in claim 5 wherein the girth of said perch means is substantially equal to the diameter of said aperture and includes upwardly converging sides.

7. The feeder set forth in claim 1 wherein said container includes a base and a flexible transparent hollow cylinder, including a cylindrical sidewall, mounted on said base; said base including a cylindrical sidewall and a convex bottomwall spanning said cylindrical sidewall; said feed aperture being provided in said base; said perch being swingably mounted on said cylindrical sidewall of said base.

8. The feeder set forth in claim 7 wherein said upstanding sidewall has an open-ended lower end sealed to said cylindrical sidewall of said base.

9. The feeder set forth in claim 1 wherein a plurality of vertically and perimetrically spaced bird seed emitting apertures are provided in said sidewall.

10. The feeder set forth in claim 1 wherein said perch comprises an elongate rod pivotally mounted on said container.

11. The feeder set forth in claim 10 wherein said plug means comprises an enlarged head mounted on said elongate rod.

12. The bird feeder set forth in claim 1 wherein said perch comprises a bird roosting member and said plug means includes a male plug receivable by said aperture when said perch is in said upstanding position; said male plug being mounted on said roosting member for to-and-fro rotation between a locked position and an unlocked position, and catch means on said sidewall and said plug cooperating to prevent swinging movement of said perch from said upstanding position to said laterally outwardly projecting position when said male plug is in said locked position.

13. The bird feeder set forth in claim 12 wherein said catch means comprises a projection on said sidewall defining a recess and an outwardly projecting tab on said male plug receivable by said recess when said male plug is in said locking position.

14. The bird feeder set forth in claim 13 wherein projection on said sidewall includes a terminal end yieldable outwardly relative to said sidewall, said catch means comprises a nib projecting laterally outwardly from said sidewall in a direction toward said terminal end for releasably securing said tab in said recess but being spaced therefrom a sufficient distance to permit said tab to snap into and out of said recess, said tab being yieldable relative to said male plug for movement between a position in alignment with said nib and a position outwardly of said nib to force said terminal end outwardly, permitting said tab to move between said nib and said terminal end.

15. The bird feeder set forth in claim 1 wherein said sidewall includes a laterally outwardly projecting member thereon mounting said perch in said laterally outwardly projecting position.

16. The bird feeder set forth in claim 15 wherein one of said laterally outwardly projecting member and said perch includes a male plug, the other of said laterally outwardly projecting member and said perch includes a hollow recess releasably receiving said male plug to hold said perch in said laterally outwardly projecting position.

17. The bird feeder set forth in claim 16 wherein said perch includes a roost member and means is provided for detachably mounting said plug means on said roost member; said perch and said laterally outwardly projecting member being separable to permit movement of said perch means to said upstanding position.

18. A bird feeder comprising:
a tubular container, having an upstanding sidewall including an open-ended lower end;
a base mounted on said lower end forming a bottomwall closure therefor;
said base including laterally outwardly opening aperture means therethrough communicating with said open-ended lower end through which bird seed is rendered available to birds for eating;
perch means mounted on said base for swinging movement between a laterally outwardly projecting, bird roosting position so that birds may roost thereon and a generally upstanding, stowed position; and
closure means mounted on said perch means for closing said laterally outwardly aperture in said base when said perch means is in said stowed position.

19. The bird feeder set forth in claim 18 wherein said sidewall comprises flexible transparent material.

20. The bird feeder set forth in claim 19 wherein said bottomwall closure includes a downwardly, laterally outwardly sloping wall means for directing bird seed within said container laterally outwardly as said seed moves downwardly under the force of gravity.

21. The bird feeder set forth in claim 18 wherein said closure means comprises plug means receivable by said laterally outwardly opening aperture in said base.

22. The bird feeder set forth in claim 18 wherein said base includes an annular sidewall sealed to said open-ended lower end and a bottomwall spanning said sidewall of said base; said bottomwall including an upwardly projecting midportion; said aperture being formed in said annular sidewall of said base; said perch means being pivotally mounted on said sidewall a predetermined distance below said aperture.

23. A throw-away bird feeder comprising:
a bird feed container including:
a hollow, flexible, pre-filled cylinder, filled with bird seed, including an upstanding transparent sidewall; and
a convex bottomwall including a raised central portion and a lower terminal edge portion;
said container including a laterally, outwardly opening aperture therein providing access for birds to said bird seed, said terminal edge portion including an upper surface generally flush with the lowermost edge of said opening;
a bird perch mounted on said container at a level below said aperture for swinging movement between a laterally outwardly projecting, generally horizontal, bird roosting position and an upstanding position alongside said sidewall; and
closure means mounted on said perch for closing said opening when said perch is in said upstanding position;
said perch comprising an elongate rod pivotally mounted on said container.

24. A bird feeder comprising:
a hollow container having an upstanding sidewall;
at least one laterally outwardly opening feed aperture in said sidewall for emitting bird feed; and
a perch for birds movable between a laterally, outwardly projecting position, so that birds can roost thereon, and an upstanding position, alongside a portion of said sidewall; and
closure means, movable between an open position in which said aperture is open to provide access for birds, roosting on said perch in said laterally outwardly projecting position, to said bird seed and a closed position, for closing said aperture when said perch is in said upstanding position;
said perch being mounted on said container, at a level below said feed aperture, for swinging movement between said laterally outwardly projecting position and said upstanding position;
said closure means being selectively movable to any one of a plurality of positions between said open and closed positions to close any selected portion of said aperture means;
said closure means comprising a band abutting said sidewall at the level of said aperture and including an opening therethrough which is in registry with said feed aperture when said closure means is in said open position and out of registry with said aperture when said closure means is in said closed position.

25. The bird feeder set forth in claim 24 wherein said band an said perch include cooperating means for detachably securing said perch to said band when said perch is in said upstanding position.

26. A bird feeder comprising:
a hollow container having an upstanding sidewall;
at least one laterally outwardly opening feed aperture in said sidewall for emitting bird feed; and
a laterally, outwardly projecting perch for birds to roost thereon, mounted on said container, at a level below said feed aperture, and
closure means, movable between an open position in which said aperture is open to permit said bird seed to be emitted through said feed aperture and a closed position, for closing said aperture when said perch is in said upstanding position;
said closure means being selectively movable to any one of a plurality of positions between said open and closed positions to close any selected portion of said aperture means;
said closure means comprising a band abutting said sidewall at the level of said aperture and including an opening therethrough which is in registry with said bird feed aperture when said closure means is in said open position and out of registry with said aperture when said closure means is in said closed position; said band communicating with said perch when said closure means is in said closed position.

* * * * *